UNITED STATES PATENT OFFICE.

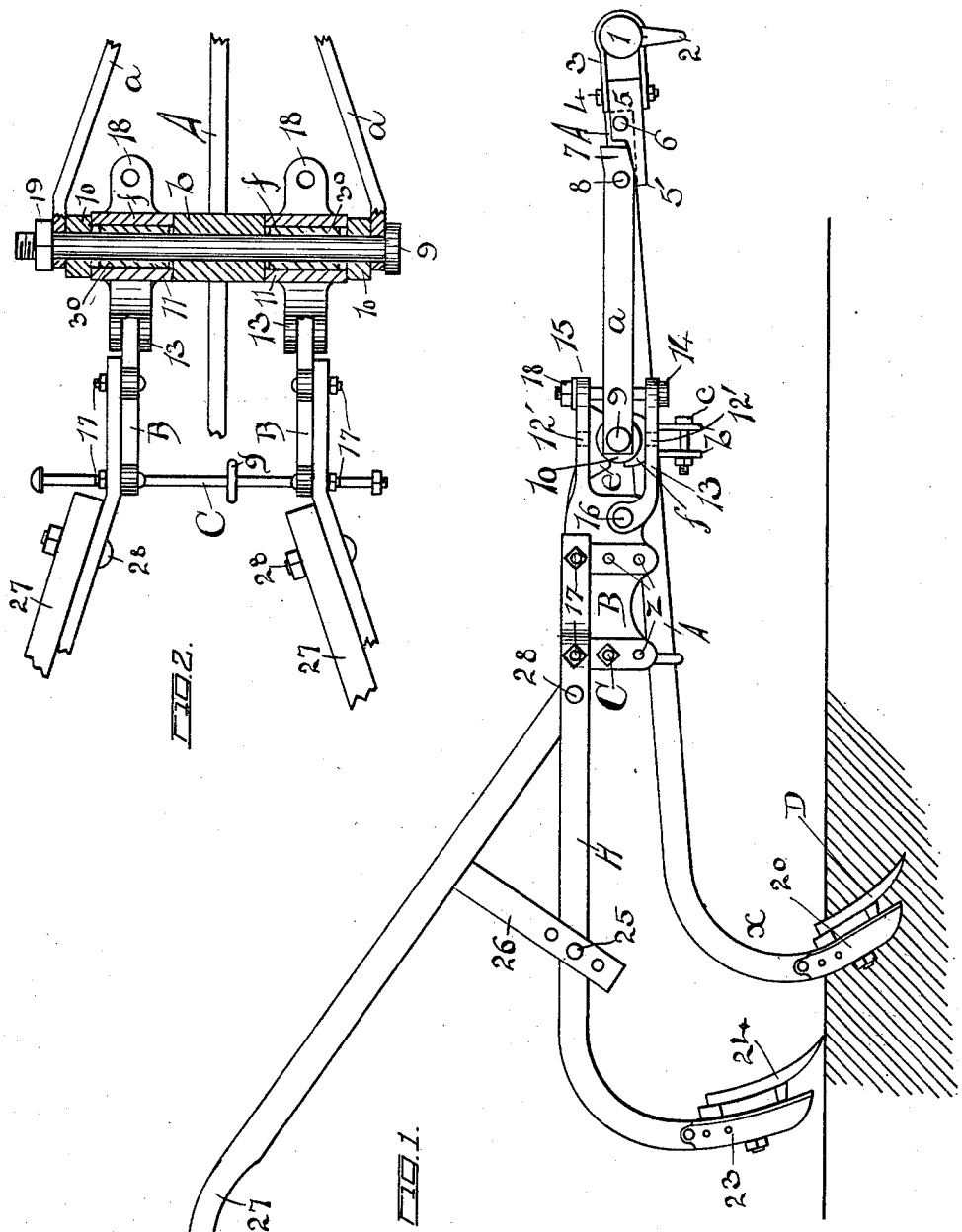

ANTON PSOTA, OF WESTPOINT, NEBRASKA.

CULTIVATOR.

SPECIFICATION forming part of Letters Patent No. 719,138, dated January 27, 1903.

Application filed October 20, 1902. Serial No. 128,046. (No model.)

*To all whom it may concern:*

Be it known that I, ANTON PSOTA, residing at Westpoint, in the county of Cuming and State of Nebraska, have invented certain useful Improvements in Cultivators; and I do hereby declare that the following is a full, clear, and exact description of the invention, such as will enable others skilled in the art to which it appertains to make and use the same, reference being had to the accompanying drawings, which form a part of this specification.

This invention relates to a new and useful improvement in cultivators.

The object of my invention is to provide a cultivator so arranged that the two side shovels may be controlled by the operator, the cultivator-shovels being so arranged that they may be carried upward and downward and laterally inward and outward.

In the accompanying drawings I have shown in Figure 1 a side elevation of a cultivator embodying my invention, while Fig. 2 shows a sectional view, with portions removed, of the mechanism used in securing the shovel-beams to the head.

In carrying out the aim of my invention I provide a central bar A. This bar is curved at its rear end, as is shown at $x$ in Fig. 1, and is provided with a narrow cultivator-shovel D, secured by means of the usual fastening 20, as is usual in cultivator construction. At the forward end this central bar A is provided with the pin 6, by means of which is secured the notched-ended holder 5, so that this holder may be tilted upward, working upon the pivot 6. Revolubly held within this holder 5 is a bolt 4, securing the strap 3, fixed to the singletree 1, provided with the usual tug-hooks 2, so that a single animal may be secured to this cultivator. At a suitable point this central bar A is provided with a U-shaped strap $b$, which is slotted, so that the central bar A passes through the same. This strap $b$ acts as a holder for a transverse shaft 9, which is in the form of a large bolt provided with the nut 19, as is shown in Fig. 2, and this shaft 9 is securely held and secured to the central bar A, so that the same cannot work laterally, by means of this U-shaped strap $b$. Working upon the shaft 9 and adjacent the U-shaped strap $b$ are two collars 30 30, (shown in Fig. 2,) and these collars 30 support the saddle-blocks $e$ and $f$, and tightly working against these saddle-blocks $e$ and $f$ are the washers 10 10. These saddle-blocks are each provided with a projecting pin, (marked 12', shown in dotted lines in Fig. 1.)

The upper saddle-block $e$ by means of its pin 12' is pivotally secured to the shovel-beam head B, provided with the forward-extending ear 15, and secured to the lower side of this head B by means of the pin 16 is the pivotally-held jaw 13, the head member 15 and jaw 13 being united by means of the bolt 14, secured by means of the nut 18, as is clearly shown in Fig. 1.

Each head B is provided with a plurality of openings $z$, so that the shovel-beams H may be adjustably secured to these heads. These shovel-beams H are each provided with the usual shovel 24, secured by means of the usual holder 23.

Secured to each shovel-beam H is a bolt 28, from which extends the handle 27, provided with a supporting-bar 26, suitably perforated to adjustably receive an ordinary bolt 25, so that these supporting-bars 26 may be secured to the shovel-beams.

Extending from the forward portion of the central bar A and secured to the forward end of this bar by means of the pin 8 are the two spreading brace-bars $a$, (shown in Figs. 1 and 2,) these brace-bars being perforated at their rear ends, so that the shaft 9 will readily pass through the same.

It will be remembered that the holder 5 was described as having its end notched and the lower projecting end 5' of the holder 5 as adapted to ride below the forward end of the brace-bars $a$, as is clearly shown in Fig. 1, so that this holder 5 may be carried upward upon the pivot-pin 6, but will not drop down farther than its contact with the brace-bars $a$ allows, as is shown in Fig. 1. From this it will be seen that the singletree 1 by means of the bolt 4 is permitted a pivotal motion in a horizontal plane and the pin 6 permitting a pivotal movement in a vertical plane. The shovel-beams are secured to the heads B by means of the bolts 17, as shown in Fig. 1.

The cultivator would be constructed as follows: The U-shaped strap $b$ would first be properly secured to the central bar A and securely fixed by means of the bolt C. The shaft 9, which, as has been described, is in the form of a bolt, would next be passed through one of the brace-bars a, as the one upon the right-hand side, as shown in Fig. 2, thence through a washer 10, then being provided with the collars 30, the shaft then being passed through the U-shaped strap b. Upon the opposite side would next be secured a counterpart collar 30, then the counterpart washer 10, the remaining brace-bar being passed through the end of the shaft 9, when the nut 19 would be threaded on the end of the same, as is clearly disclosed in Fig. 2. The next step would be to secure the saddle blocks or bearings e and f to the collar 30 and then by means of their projecting pins 12' secure the head 15 and jaw 13, the bolt 14 then being extended through the head and jaw to secure the bearings e and f to the collar 30.

Now it is desired to construct this cultivator so that either the right or left shovel may be carried inward or outward, upward or downward, as the operator may desire. In order to provide a proper tension, the nut 19 is next adjusted so that the washers 10 securely bind against the saddle-blocks e and f, which form bearings, as it were, and so that these saddle blocks or bearings are pinched or impinged between the washers 10 and the U-shaped strap b, so that these bearings are held under frictional contact. According to this construction it will be noticed that in raising the shovel-beams H upward or downward the saddle-blocks e and f will rub against the washers 10 and against the U-shaped strap b.

In carrying the shovel-beams H to the side the head 15 and jaw 13 must rotate and pivot about the pins 12', and in order to regulate the tension here the nuts 18 are adjusted so a tight tension may be obtained by means of the nuts 19 and 18.

Now in going through the field the cultivator is carried by means of the central shovel 24, which works in the center of the furrow between the plants. The operator then carries the side shovels D to the right or left, as the conditions may require, and can also raise and lower the shovels, as they are permitted a vertical and lateral movement by virtue of the connections described.

In order to prevent the shovel-beams moving outward too far, I provide the heads B with a bolt C, from which extends a ring g, secured to the bar A, so that the operator may raise the cultivator entirely from the ground in carrying the rear end of the same by means of the handles 27, while the forward end of the cultivator will be carried by the horse.

Having thus described my said invention, what I claim as new, and desire to secure by United States Letters Patent, is—

1. The combination with a central shovel-supported bar, a shaft secured near the forward end of said bar, bearings secured to said shaft permitting a movement in a vertical plane, heads secured to said bearings permitting a pivotal movement in a horizontal plane and a shovel-beam secured to each of said heads.

2. The combination in a cultivator with a central shovel-provided beam, of a transverse shaft secured near the forward end of said beam, a bearing secured to said shaft upon opposite sides of said beam to permit a movement in a vertical plane, a head pivotally secured to each of said bearings, permitting a pivotal movement in a horizontal plane, shovel-provided beams secured to each of said heads, operating-handles extending from each of said beams and means to connect said shovel-beams to said central bar.

3. In a cultivator, the combination with a central shovel-provided beam, a singletree secured at the forward end of said beam, a shaft laterally secured to said beam, bearings upon said shaft upon opposite sides of said beam, heads pivotally secured to said bearings, shovel-beams extending from said heads, a rod uniting said beams to regulate their spread, handles secured to each shovel-beam and means to secure said shovel-beams to said central beams, all arranged substantially as and for the purpose set forth.

In testimony whereof I affix my signature in presence of two witnesses.

ANTON PSOTA.

Witnesses:
W. F. S. NILIGH,
P. M. MOODIE.